United States Patent Office 3,775,300
Patented Nov. 27, 1973

3,775,300
HYDROCARBON CONVERSION WITH A CATALYTIC COMPOSITE OF PLATINUM IRON AND GERMANIUM
John C. Hayes, Palatine, Ill., assignor to Universal Oil Products Company, Des Plaines, Ill.
No Drawing. Original application Mar. 2, 1970, Ser. No. 15,961, now abandoned. Divided and this application Jan. 10, 1972, Ser. No. 216,738
Int. Cl. B10j *11/08, 11/22, 11/78;* C10g *35/06*
U.S. Cl. 208—139                                              12 Claims

ABSTRACT OF THE DISCLOSURE

Hydrocarbons are converted by contacting, at conversion conditions, with a catalytic composite comprising a combination of catalytically effective amounts of a platinum group component, an iron component, and a Group IV-A metallic component with a porous carrier material. A specific example of the disclosed hydrocarbon conversion process is a process for reforming a gasoline fraction which comprises contacting the gasoline fraction and hydrogen, at reforming conditions, with a catalytic composite comprising a combination of catalytically effective amounts of a platinum component, an iron component, a germanium component and a halogen component with an alumina carrier material.

CROSS-REFERENCES TO RELATED APPLICATIONS

This application is a division of my prior, copending application Ser. No. 15,961, filed Mar. 2, 1970, now abandoned.

DISCLOSURE

The subject of the present invention is a novel catalytic composite which has exceptional activity and resistance to deactivation when employed in a hydrocarbon conversion process that requires a catalyst having both a hydrogenation-dehydrogenation function and a cracking function. More precisely, the present invention involves a novel dual function catalytic composite which, quite surprisingly, enables substantial improvements in hydrocarbon conversion processes that have traditionally used a dual-function catalyst. In another aspect, the present invention comprehends the improved processes that are produced by the use of a catalytic composite comprising a combination of a platinum group component, an iron component, and a Group IV-A metallic component with a porous carrier material; specifically, an improved reforming process which utilizes the subject catalyst to improve activity, selectivity, and stability characteristics.

Composites having a hydrogenation-dehydrogenation function and a cracking function are widely used today as catalysts in many industries, such as the petroleum and petrochemical industry, to accelerate a wide spectrum of hydrocarbon conversion recations. Generally, the cracking function is thought to be associated with an acid-acting material of the porous, adsorptive, refractory oxide type which is typically utilized as the support or carrier for a heavy metal component such as the metals or compounds of metals of Group V through VIII of the Periodic Table to which are generally attributed the hydrogenation-dehydrogenation function.

These catalytic composites are used to accelerate a wide variety of hydrocarbon conversion reactions such as hydrocracking, isomerization, dehydrogenation, hydrogenation, desulfurization, cyclization, alkylation, polymerization, cracking, hydroisomerization, etc. In many cases, the commercial applications of these catalysts are in processes where more than one of these reactions are proceeding simultaneously. An example of this type of process is reforming wherein a hydrocarbon feed stream containing paraffins and naphthenes is subjected to conditions which promote dehydrogenation of naphthenes to aromatics, dehydrocyclization of paraffins to aromatics, isomerization of paraffins and naphthenes, hydrocracking of naphthenes and paraffins and the like reactions, to produce an octane-rich or aromatic-rich product stream. Another example is a hydrocracking process wherein catalysts of this type are utilized to effect selective hydrogenation and cracking of high molecular weight unsaturated materials, selective hydrocracking of high molecular weight materials, and other like reactions, to produce a generally lower boiling, more valuable output stream. Yet another example is an isomerization process wherein a hydrocarbon fraction which is relatively rich in straight-chain paraffin components is contacted with a dual-function catalyst to produce an output stream rich in isoparaffin compounds.

Regardless of the reaction involved or the particular process involved, it is of critical importance that the dual-function catalyst exhibit not only the capability to initially perform its specified functions, but also that it has the capability to perform them satisfactorily for prolonged periods of time. The analytical terms used in the art to measure how well a particular catalyst performs its intended functions in a particular hydrocarbon reaction environment are activity, selectivity, and stability. And for purposes of discussion here, these terms are conveniently defined for a given charge stock as follows: (1) activity is a measure of the catalyst's ability to convert hydrocarbon reactants into products at a specified severity level where severity level means the conditions used—that is, the temperature, pressure, contact time, and presence of diluents such as $H_2$; (2) selectivity refers to the amount of desired product or products obtained relative to the amount of reactants converted; (3) stability refers to the rate of change with time of the activity and selectivity parameters—obviously, the smaller rate implying the more stable catalyst.

In a reforming process, for example, activity commonly refers to the amount of conversion that takes place for a given charge stock at a specified severity level and is typically measured by octane number of the $C_5+$ product stream; selectivity refers to the amount of $C_5+$ yield that is obtained at the particular severity level; and stability is typically equated to the rate of change with time of activity, as measured by octane number of $C_5+$ product, and of selectivity, as measured by $C_5+$ yield. Actually, the last statement is not strictly correct because generally a continuous reforming process is run to produce a constant octane $C_5+$ product with severity level being continuously adjusted to attain this result; and, furthermore, the severity level is for this process usually varied by adjusting the conversion temperature in the reaction zone so that, in point of fact, the rate of change of activity finds response in the rate of change of conversion temperatures and changes in this last parameter are customarily taken as indicative of activity stability.

As is well known to those skilled in the art, the principal cause of observed deactivation or instability of a dual-function catalyst when it is used in a hydrocarbon conversion reaction is associated with the fact that coke forms on the surface of the catalyst during the course of the reaction. More specifically, in these hydrocarbon conversion processes, the conditions utilized typically result in the formation of heavy, high molecular weight, black, solid or semi-solid, carbonaceous material which coats the surface of the catalyst and reduces its activity by shielding its active sites from the reactants. In other words, the performance of this dual-function catalyst is sensitive to the presence of carbonaceous deposits on the surface of the catalyst. Accordingly, the major problem facing workers in this area of the art is the development of more active and selective catalytic composites that are not as sensitive to the presence of these carbonaceous materials and/or have the capability to suppress the rate of the formation of these carbonaceous materials on the catalyst. Viewed in terms of performance parameters, the problem is to develop a dual-function catalyst having superior activity, selectivity, and stability. In particular, for a reforming process the problem is typically expressed in terms of shifting and stabilizing the $C_5+$ yield-octane relationship—$C_5+$ yield being representative of selectivity and octane being proportional to activity.

I have now found a dual-function catalytic composite which possesses improved activity, selectivity, and stability when it is employed in a process for the conversion of hydrocarbons of the type which have heretofore utilized dual-function catalytic composites such as processes for isomerization, hydroisomerization, dehydrogenation, desulfurization, denitrogenization, hydrogenation, alkylation, dealkylation, hydrodealkylation, transalkylation, cyclization, dehydrocyclization, cracking, hydrocracking, reforming, and the like processes. In particular, I have found that a combination of catalytically effective amounts of a platinum group component, an iron component, and a Group IV-A metallic component with a porous refractory carrier material enables the performance of hydrocarbon conversion processes utilizing dual-function catalysts to be substantially improved. Moreover, I have determined that a catalytic composite comprising a combination of catalytically effective amounts of a platinum component, a Group IV-A metallic component, an iron component, and a halogen component with an alumina carrier material can be utilized to substantially improve the performance of a reforming process which operates on a gasoline fraction to produce a high octane reformate. In the case of a reforming process, the principal advantage associated with the use of the novel catalyst of the present invention involves the acquisition of the capability to operate in a stable manner in a high severity operation; for example, a low pressure reforming process designed to produce a $C_5+$ reformate having an octane of about 100 F-1 clear. As indicated the present invention essentially involves the finding that the addition of a Group IV-A metallic component and an iron component to a dual-function hydrocarbon conversion catalyst containing a platinum group component enables the performance characteristics of the catalyst to be sharply and materially improved.

It is, accordingly, one object of the present invention to provide a hydrocarbon conversion catalyst having superior performance characteristics when utilized in a hydrocarbon conversion process. A second object is to provide a catalyst having dual-function hydrocarbon conversion performance characteristics that are relatively insensitive to the deposition of hydrocarbonaceous material thereon. A third object is to provide preferred methods of preparation of this catalytic composite which insures the achievement and maintenance of its properties. Another object is to provide an improved reforming catalyst having superior activity, selectivity, and stability. Yet another object is to provide a dual-function hydrocarbon conversion catalyst which utilizes a combination of a Group IV-A metallic component and an iron component to promote a platinum metal component.

In brief summary, the present invention is, in one embodiment, a catalytic composite comprising a combination of catalytically effective amounts of a platinum group component, an iron component, and a Group IV-A metallic component with a porous carrier material. The porous carrier material is typically a porous, refractory material such as a refractory inorganic oxide, and the Group IV-A metallic component, the iron component, and the platinum group component are usually utilized in relatively small amounts which are effective to promote the desired hydrocarbon conversion reaction.

A second embodiment relates to a catalytic composite comprising a combinaion of catalytically effective amounts of a platinum component, an iron component, a germanium component, and a halogen component with an alumina carrier material. These components are preferably present in the composite in amounts sufficient to result in the final composite containing, on an elemental basis, about 0.1 to about 3.5 wt. percent halogen, about 0.01 to about 2 wt. percent platinum, about 0.01 to about 1 wt. percent iron, and about 0.01 to about 5 wt. percent germanium.

Another embodiment relates to a catalytic composite comprising a combination of the catalytic composite described above with a sulfur component in an amount sufficient to incorporate about 0.05 to about 0.5 wt. percent sulfur, calculated on an elemental basis.

Still another embodiment relates to a process for the conversion of a hydrocarbon comprising contacting the hydrocarbon and hydrogen with the catalytic composite described above in the first embodiment at hydrocarbon conversion conditions.

A preferred embodiment relates to a process for reforming a gasoline fraction which comprises contacting the gasoline fraction and hydrogen with the catalytic composite described above in the second embodiment at reforming conditions selected to produce a high-octane reformate.

Other objects and embodiments of the present invention relate to additional details regarding preferred catalytic ingredients, preferred amounts of catalytic ingredients suitable methods of composite preparation, operating conditions for use in the hydrocarbon conversion processes, and the like particulars which are hereinafter given in the following detailed discussion of each of these facets of the present invention.

As indicated above, the catalyst of the present invention comprises a porous carrier material or support having combined therewith catalytically effective amounts of a platinum group component, an iron component, a Group IV-A metallic component, and in the preferred case a halogen component. Considering first the porous carrier material utilized in the present invention, it is preferred that the material be a porous, adsorptive, high-surface area support having a surface area of about 25 to about 500 m.$^2$/gm. The porous carrier material should be relatively refractory to the conditions utilized in the hydrocarbon conversion process, and it is intended to include within the scope of the present invention carrier materials which have traditionally been utilized in dual-function hydrocarbon conversion catalysts such as: (1) activated carbon, coke, or charcoal; (2) silica or silica gel, silicon carbide, clays, and silicates including those synthetically prepared and naturally occurring, which may or may not be acid treated, for example, attapulgus clay, china clay, diatomaceous earth, fuller's earth, kaolin, kieselguhr, etc.; (3) ceramics, porcelain, crushed firebrick, bauxite; (4) refractory inorganic oxides such as alumina, titanium dioxide, zirconium dioxide, chromium oxide, zinc oxide, magnesia, thoria, boria, silica-alumina, silica-magnesia, chromia-alumina, alumina-boria, silica-zirconia, etc.; (5) crystalline aluminosilicates such as naturally occurring or synthetically prepared mordenite and/or fajasite, either in the hydrogen form or in a form which has been treated with multivalent cations; and, (6) combinations of one or more elements from these groups. The preferred porous carrier materials for use in the present invention are refractory inorganic oxides, with best results obtained with an alumina carrier material. Suitable alumina materials are the crystlline aluminas known s the gamma-, eta-, and theta-aluminas, with gamma-alumina giving best results. In ddition, in some embodiments, the alumina carrier material may contain minor proportions of other well known refractory inorganic oxides such as silica, zirconia, magnesia, etc.; however, the preferred support is substantially pure gamma-alumina. Preferred carrier materials have an apparent bulk density of about 0.3 to about 0.7 gm./cc. and surface area characteristics such that the average pore diameter is about 20 to 300 angstroms, the pore volume is about 0.1 to about 1 ml./gm. and the surface area is about 100 to about 500 m.²/gm. In general, excellent results are typically obtained with a gamma-alumina carrier material which is used in the form of spherical particles having: a relatively small diameter (i.e., typically about 1/16 inch), an apparent bulk density of about 0.5 gm./cc., a pore colume of about 0.4 ml./gm., and a surface area of about 175 m.²/gm.

The preferred alumina carrier material may be prepared in any suitable manner and may be synthetically prepared or natural occurring. Whatever type of alumina is employed it may be activated prior to use by one or more treatments including drying, calcination, steaming, etc., and it may be in a form known as activated alumina, activated alumina of commerce, porous alumina, alumina gel, etc. For example, the alumina carrier may be prepared by adding a suitable alkaline reagent, such as ammonium hydroxide to a salt of aluminum such as aluminum chloride, aluminum nitrate, etc., in an amount to form an aluminum hydroxide gel which upon drying and calcining is converted to alumina. The alumina carrier may be formed in any desired shape such as spheres, pills, cakes, extrudates, powders, granules, etc., and utilized in any desired size. For the purpose of the present invention a particularly preferred form of alumina is the sphere; and alumina spheres may be continuously manufactured by the well-known oil drop method which comprises: forming an alumina hydrosol by any of the techniques taught in the art and preferably by reacting aluminum metal with hydrochloric acid; combining the resulting hydrosol with a suitable gelling agent; and dropping the resultant mixture into an oil bath maintained at elevated temperatures. The droplets of the mixture remain in the oil bath until they set and form hydrogel spheres. The spheres are then continuously withdrawn from the oil bath and typically subjected to specific drying treatments in oil and an ammoniacal solution to further improve their physical characteristics. The resulting aged and gelled particles are then washed and dried at a relatively low temperature of about 300° F. to about 400° F. and subjected to a calcination procedure at a temperature of about 850° F. to about 1300° F. for a period of about 1 to about 20 hours. This treatment effects conversion of the alumina hydrogel to the corresponding crystalline gamma-alumina. See the teachings of U.S. Pat. No. 2,620,314 for additional details.

One essential constituent of the instant catalytic composite is the group IV-A metallic component. By the use of the generic term "Group IV-A metallic component" it is intended to cover the metals and compounds of the metals of Group IV-A of the Periodic Table. More specifically, it is intended to cover: germanium and the compounds of germanium; tin and the compounds of tin; lead and the compounds of lead; and mixtures of these metals and/or compounds of metals. This Group IV-A metallic component may be present in the catalytic composite as an elemental metal, or in chemical combination with one or more of the other ingredients of the composite, or as a chemical compound of the Group IV-A metal such as the oxide, sulfide, halide, oxyhalide, oxychloride, aluminate, and the like compounds. Based on the evidence currently available, it is believed that best results are obtained when the Group IV-A metallic component exists in the final composite in an oxidation state above that of the elemental metal, and the subsequently described oxidation and reduction steps, that are preferably used in the preparation of the instant composite, are believed to result in a catalytic composite which contains an oxide of the Group IV-A metallic component such as germanium oxide, tin oxide and lead oxide. Regardless of the state in which this component exists in the composite, it can be utilized therein in any amount which is catalytically effective with the preferred amount being about 0.01 to about 5 wt. percent thereof, calculated on an elemental basis. The exact amount selected within this broad range is preferably determined as a function of the particular Group IV-A species that is utilized. For instance, in the case where this component is lead, it is preferred to select the amount of this component from the low end of this range—namely, about 0.01 to about 1 wt. percent. Additionally, it is preferred to select the amount of lead as a function of the amount of the platinum group component as explained hereinafter. In the case where this component is tin, it is preferred to select from a relatively broader range of about 0.05 to about 2 wt. percent thereof. And, in the preferred case, where this component is germanium, the selection can be made from the full breadth of the stated range—specifically, about 0.1 to about 5 wt. percent with best results at about 0.05 to about 2 wt. percent. This Group IV-A component may be incorporated in the composite in any suitable manner known to the art such as by coprecipitation or cogellation with the porous carrier material, ion exchange with the carrier material, or impregnation of the carrier material at any stage in its preparation. It is to be noted that it is intended to include within the scope of the present invention all conventional procedures for incorporating a metallic component into a catalytic composite, and the particular method of incorporation used is not deemed to be an essential feature of the present invention. However, best results are believed to be obtained when the Group IV-A component is uniformly distributed throughout the porous carrier material. One acceptable method of incorporating the Group IV-A component into the catalytic composite involves cogelling the Group IV-A component during the preparation of the preferred carrier material, alumina.

This method typically involves the addition of a suitable soluble compound of the Group IV-A metal of interest to the alumina hydrosol. The resulting mixture is then commingled with a suitable gelling agent such as a relatively weak alkaline reagent, and the resulting mixture is thereafter preferably gelled by dropping into a hot oil bath as explained hereinbefore. After aging, drying and calcining the resulting particles there is obtained an intimate combination of the oxide of the group IV-A metal and alumina. One preferred method of incorporating this component into the composite involves utilization of a soluble, decomposable compound of the particular Group IV-A metal of interest to impregnate the porous carrier material either before, during or after the carrier material is calcined. In general, the solvent used during this impregnation step is selected on the basis of its capability to dissolve the desired Group IV-A compound without affecting the porous carrier material which is to be impregnated; ordinarily, good results are obtained when water is the solvent; thus the preferred Group IV-A compounds for use in this impregnation step are typically water-soluble and decomposable. Examples of suitable Group IV-A compounds are: germanium difluoride, germanium tetrafluoride, germanium dioxide, germanium monosulfide, tin dibromide, tin dibromide di-iodide, tin dichloride di-iodide, tin chromate, tin difluoride, tin tetrafluoride, tin tetraiodide, tin sulfate, tin tartrate, lead acetate, lead bromate, lead bromide, lead chlorate, lead chloride, lead citrate, lead formate, lead lactate, lead malate, lead nitrate, lead nitrite, lead dithionate, and the like compounds. In the case where the Group IV-A component is germanium, a preferred impregnation solution is germanium tetrachloride dissolved in anhydrous ethanol. In the case of tin, tin chloride dissolved in water is preferred. And in the case of lead, lead nitrate in water is preferred. Regardless of which impregnation solution is utilized the Group IV-A component can be impregnated either prior to, simultaneously with, or after the other metallic components are added to the carrier material. Ordinarily, best results are obtained when this component is impregnated simultaneously with the other metallic components of the composite. Likewise, best results are ordinarily obtained when the Group IV-A component is germanium or a compound of germanium.

Regardless of which Group IV-A compound is used in the preferred impregnation step, it is important that the Group IV-A component be uniformly distributed throughout the carrier material. In order to achieve this objective it is necessary to maintain the pH of the impregnation solution in a range of about 1 to about 7 and to dilute the impregnation solution to a volume which is substantially in excess of the volume of the carrier material which is impregnated. It is preferred to use a volume ratio of impregnation solution to carrier material of at least 1.5:1 and preferably about 2:1 to about 10:1 or more. Similarly, it is preferred to use a relatively long contact time during the impregnation step ranging from about ¼ hour up to about ½ hour or more, before drying to remove excess solvent, in order to insure a high dispersion of the Group IV-A metallic component on the carrier material. The carrier material is likewise, preferably constantly agitated during this preferred impregnation step.

As indicated above, a second essential ingredient of the subject catalyst is the platinum group component. Although the process of the present invention is specifically directed to the use of a catalytic composite containing platinum, it is intended to include other platinum group metals such as palladium, rhodium, ruthenium, osmium, and iridium. The platinum group component, such as platinum, may exist within the final catalytic composite as a compound such as an oxide, sulfide, halide, etc., or as an elemental metal. Generally, the amount of the platinum group component present in the final catalyst composite is small compared to the quantities of the other components combined therewith. In fact, the platinum group component generally comprises about 0.01 to about 2 wt. percent of the final catalytic composite, calculated on an elemental basis. Excellent results are obtained when the catalyst contains about 0.05 to about 1 wt. percent of the platinum group metal. The preferred platinum group component is platinum or a compound of platinum although good results are obtained when it is palladium or a compound of palladium.

The platinum group component may be incorporated in the catalytic composite in any suitable manner such as coprecipiation or cogellation, ion-exchange, or impregnation. The preferred method of preparing the catalyst involves the utilization of a soluble, decomposable compound of a platinum group metal to impregnate the carrier material. Thus, the platinum group component may be added to the support by commingling the latter with an aqueous solution of chloroplatinic acid. Other water-soluble compounds of platinum group metal may be employed in impregnation solutions and include ammonium chloroplatinate, bromoplatinic acid, platinum dichloride, platinum tetrachloride hydrate, platinum dichlorocarbonyl dichloride, dinitrodiaminoplatinum, palladium chloride, palladium nitrate, palladium sulfate, etc. The utilization of a platinum chloride compound, such as chloroplatinic acid, is preferred since it facilitates the incorporation of both the platinum component and at least a minor quantity of the preferred halogen component in a single step. Hydrogen chloride or the like acid is also generally added to the impregnation solution in order to further facilitate the incorporation of the halogen component and the distribution of the metallic component. In addition, it is generally preferred to impregnate the carrier material after it has been calcined in order to minimize the risk of washing away the valuable platinum metal compounds; however, in some cases it may be advantageous to impregnate the carrier material when it is in a gelled state.

Yet another essential ingredient of the present catalytic composite is an iron component. This component may be present in the composite as an elemental metal, or in chemical combinations with one or more of the other ingredients of the composite, or as a chemical compound or iron such as iron oxide, sulfide, halide, oxychloride, aluminate, and the like. The iron component may be utilized in the composite in any amount which is catalytically effective, with the preferred amount being about 0.01 to about 1 wt. percent thereof, calculated on an elemental iron basis. Typically best results are obtained with about 0.05 to about 0.5 wt. percent iron. It is, additionally, preferred to select the specific amount of iron from within this broad weight range as a function of the amount of the platinum group component, on an atomic basis, as is explained hereinafter. The iron component may be incorporated into the catalytic composite in any suitable manner known to those skilled in the catalyst formulation art. In addition, it may be added at any stage of the preparation of the composite—either during preparation of the carrier material or thereafter—and the precise method of incorporation used is not deemed to be critical. However, best results are thought to be obtained when the iron component is relatively uniformly distributed throughout the carrier material, and the preferred procedures are the ones known to result in a composite having this relatively uniform distribution. One preferred procedure for incorporating this component into the composite involves cogelling or coprecipitating the iron component during the preparation of the preferred carrier material, alumina. This procedure usually comprehends the addition of a soluble, decomposable compound of iron such as iron dichloride to the alumina hydrosol before it is gelled. The resulting mixture is then finished by conventional gelling, aging, drying and calcination steps as explained hereinbefore. Another preferred way of incorporating this component is an impregnation step wherein the porous carrier material is impregnated with a suitable iron-containing solution either before, during or after the carrier material is calcined. Preferred impregnation solutions are aqueous solutions of water soluble, decomposable iron compounds such as iron acetate, iron dibromide, iron tribromide, iron perchlorate, iron dichloride, iron trichloride, iron di-iodide, iron malate, iron lactate, iron nitrate, iron oxalate, and the like compounds. Best results are ordinarily obtained when the impregnation solution is an aqueous solution of iron chloride or iron nitrate. This iron component can be added to the carrier material, either prior to, simultaneously with, or after the other metallic components are combined therewith. Best results are usually achieved when this component is added simultaneously with the other metallic components. In fact, excellent results are obtained, as reported in the examples, with a one step impregnation procedures using an aqueous solution comprising chloroplatinic acid, iron dichloride, hydrochloric acid and a suitable compound of the desired group IV-A metal.

A preferred ingredient of the instant catalytic composite is a halogen component. Accordingly, a preferred embodiment of the present invention involves a catalytic composite comprising a combination of catalytically effective amounts of a platinum group component, an iron component, a Group IV-A metallic component, and a halogen component with an alumina carrier material. Although the precise form of the chemistry of the association of the halogen component with the carrier material is not entirely known, it is customary in the art to refer to the halogen component as being combined with the carrier material, or with the other ingredients of the catalyst. This combined halogen may be either fluorine, chlorine, iodine, bromine, or mixtures thereof. Of these, fluorine and particularly chlorine are preferred for the purposes of the present invention. The halogen may be added to the carrier material in any suitable manner either during preparation of the support or before or after the addition of the other components. For example, the halogen may be added at any stage of the preparation of the carrier material or to the calcined carrier material, as an aqueous solution of an acid such as hydrogen fluoride, hydrogen chloride, hydrogen bromide, etc. The halogen component or a portion thereof may be composited with the carrier material during the impregnation of the latter with the platinum group component; for example, through the utilization of a mixture of chloroplatinic acid and hydrogen chloride. In another situation, the alumina hydrosol which is typically utilized to form the preferred alumina carrier material may contain halogen and thus contribute at least a portion of the halogen component to the final composite. For reforming, the halogen will be typically combined with the carrier material in an amount sufficient to result in a final composite that contains about 0.1 to about 3.5 wt. percent and preferably about 0.5 to about 1.5 wt. percent of halogen calculated on an elemental basis. In isomerization or hydrocracking embodiments, it is generally preferred to utilize relatively large amounts of halogen in the catalyst—typically ranging up to about 10 wt. percent halogen calculated on an elemental basis, and more preferably about 1 to about 5 wt. percent.

Regarding the preferred amounts of the various metallic components of the subject catalyst, I have found it to be a good practice to specify the amounts of the iron component and of the Group IV-A metallic component as a function of the amount of the platinum group component. On this basis, the amount of the iron component is ordinarily selected so that the atomic ratio of iron to the platinum group metal contained in the composite is about 0.1:1 to 1.5:1. Similarly, the amount of the Group IV-A metallic component is ordinarily selected to produce a composite containing an atomic ratio of Group IV-A metal to platinum group metal within the broad range of about 0.05:1 to 10:1. However, for the Group IV-A metal to platinum group metal ratio, the best practice is to select this ratio on the basis of the following preferred ranges for the individual species: (1) for germanium, it is about 0.3:1 to 10:1 with the most preferred range being about 0.6:1 to about 6:1; (2) for tin, it is about 0.1:1 to 3:1, with the most preferred range about 0.5:1 to 1.5:1; and (3) for lead, it is about 0.05:1 to 0.9:1, with the most preferred range being about 0.1:1 to 0.75:1.

Another significant parameter for the present catalyst is the "total metals content" which is defined to be the sum of the platinum group component, the iron component, and the Group IV-A metallic component, calculated on an elemental basis. Good results are ordinarily obtained with the subject catalyst when this parameter is fixed at a value of about 0.15 to about 2.5 wt. percent, with best results ordinarily achieved at a metals loading of about 0.3 to about 2 wt. percent.

In embodiments of the present invention wherein the instant catalytic composite is used for dehydrogenation of dehydrogenatable hydrocarbons or for the hydrogenation of hydrogenatable hydrocarbons, it is ordinarily a preferred practice to include an alkali or alkaline earth metal component in the composite. More precisely, this optional component is selected from the group consisting of the compounds of the alkali metals—cesium, rubidium, potassium, sodium, and lithium—and the compounds of the alkaline earth metals—calcium, strontium, barium and magnesium. Generally, good results are obtained in these embodiments when this component constitutes about 1 to about 5 wt. percent of the composite, calculated on an elemental basis.

Integrating the above discussion of each of the essential and preferred ingredients of the catalytic composite, it is evident that a particularly preferred catalytic composite for reforming comprises a combination of a platinum component, an iron component, a germanium component, and a halogen component with an alumina carrier material in amounts sufficient to result in the composite containing about 0.5 to about 1.5 wt. percent halogen, about 0.05 to about 1 wt. percent platinum, about 0.05 to about 0.5 wt. percent iron, and about 0.05 to about 2 wt. percent germanium.

Regardless of the details of how the components of the catalyst are combined with the porous carrier material, the final catalyst generally will be dried at a temperature of about 200° to about 600° F. for a period of from about 2 to about 24 hours or more, and finally calcined at a temperature of about 700° F. to about 1100° F. in an air atmosphere for a period of about 0.5 to about 10 hours in order to convert the metallic components substantially to the oxide form. In the case where a halogen component is utilized in the catalyst, best results are generally obtained when the halogen content of the catalyst is adjusted during the calcination step by including water and a halogen or a halogen-containing compound in the air atmosphere utilized. In particular, when the halogen component of the catalyst is chlorine, it is preferred to use a mole ratio of $H_2O$ to HCl of about 20:1 to about 100:1 during at least a portion of the calcination step in order to adjust the final chlorine content of the catalyst to a range of about 0.5 to about 1.5 wt. percent.

Although it is not essential, it is preferred that the resultant calcined catalytic composite be subjected to a substantially water-free reduction step prior to its use in the conversion of hydrocarbons. This step is designed to insure a uniform and finely divided dispersion of the metallic components throughout the carrier material. Preferably, substantially pure and dry hydrogen (i.e., less than 20 vol. p.p.m. $H_2O$) is used as the reducing agent in this step. The reducing agent is contacted with the calcined catalyst at a temperature of about 800° F. to about 1200° F. and for a period of time of about 0.5 to 10 hours or more effective to substantially reduce at least the platinum group component to the elemental state. This reduction treatment may be performed in situ as part of a start-up sequence if precautions are taken to predry the plant to a substantially water-free state and if substantially water-free hydrogen is used.

The resulting reduced catalytic composite may, in some cases, be beneficially subjected to a presulfiding operation designed to incorporate in the catalytic composite from about 0.05 to about 0.50 wt. percent sulfur calculated on an elemental basis. Preferably, this presulfiding treatment takes place in the presence of hydrogen and a suitable sulfur-containing compound such as hydrogen sulfide, lower molecular weight mercaptans, organic sulfides, etc. Typcially, this procedure comprises treating the reduced catalyst with a sulfiding gas such as a mixture of hydrogen and hydrogen sulfide having about 10 moles of hydrogen per mole of hydrogen sulfide at conditions sufficient to effect the desired incorporation of sulfur, generally including a temperature ranging from about 50° F. up to about 1100° F. or more. It is generally a good practice to perform this optional presulfiding step under substantially water-free conditions.

According to the present invention, a hydrocarbon charge stock and hydrogen are contacted with a catalyst of the type described above in a hydrocarbon conversion zone. This contacting may be accomplished by using the catalyst in a fixed bed system, a moving bed system, a fluidized bed system, or in a batch type operation; however, in view of the danger of attrition losses of the valuable catalyst and of well known operational advantages, it is preferred to use a fixed bed system. In this system, a hydrogen-rich gas and the charge stock are pre-heated by any suitable heating means to the desired reaction temperature and then are passed, into a conversion zone containing a fixed bed of the catalyst type previously charterized. It is, of course, understood that the conversion zone may be one or more separate reactors with suitable means therebetween to insure that the desired conversion temperature is maintained at the entrance to each reactor. It is also important to note that the reactants may be contacted with the catalyst bed in either upward, downward, or radial flow fashion with the latter being preferred. In addition, the reactants may be in the liquid phase, a mixed liquid-vapor phase, or a vapor phase when they contact the catalyst, with best results obtained in the vapor phase.

In the case where the catalyst of the present invention is used in a reforming operation, the reforming system will comprise a reforming zone containing a fixed bed of the catalyst type previously characterized. This reforming zone may be one or more separate reactors with suitable heating means therebetween to compensate for the endothermic nature of the reactions that take place in each catalyst bed. The hydrocarbon feed stream that is charged to this reforming system will comprise hydrocarbon fractions containing naphthenes and paraffins that boil within the gasoline range. The preferred charge stocks are those consisting essentially of naphthenes and paraffins, although in many cases aromatics will also be present. This preferred class includes straight run gasolines, natural gasolines, synthetic gasolines, and the like. On the other hand, it is frequently advantageous to charge thermally or catalytically cracked gasolines or higher boiling fractions thereof. Mixtures of straight run and cracked gasolines can also be used to advantage. The gasoline charge stock may be a full boiling gasoline having an initial boiling point of from about 50° F. to about 150° F. and an end boiling point within the range of from about 325° F. to about 425° F. or may be a selected fraction thereof which generally will be a higher boiling fraction commonly referred to as a heavy naphtha—for example, a naphtha boiling in the range of $C_7$ to 400° F. In some cases, it is also advantageous to charge pure hydrocarbons or mixtures of hydrocarbons that have been extracted from hydrocarbon distillates — for example, straight-chain paraffins—which are to be converted to aromatics. It is preferred that these charge stocks be treated by conventional catalytic pretreatment methods such as hydrorefining, hydrotreating, hydrodesulfurization, etc., to remove substantially all sulfurous, nitrogenous and water-yielding contaminants therefrom, and to saturate any olefins that may be contained therein.

In other hydrocarbon conversion embodiments, the charge stock will be of the conventional type customarily used for the particular kind of hydrocarbon conversion being effected. For example, in a typical isomerization embodiment the charge stock can be a paraffinic stock rich in $C_4$ to $C_8$ normal paraffins, or a normal butane-rich stock or a n-hexane-rich stock or a mixture of xylene isomers, etc. In hydrocracking embodiments the charge stock will be typically a gas oil, heavy cracked cycle oil, etc. In addition, alkylaromatic and naphthenes can be conveniently isomerized by using the catalyst of the present invention. Likewise, pure hydrocarbons or substantially pure hydrocarbons can be converted to more valuable products by using the catalyst of the present invention in any of the hydrocarbon conversion processes known to the art that use a dual-function catalyst.

In a reforming embodiment, it is generally a preferred practice to use the present catalytic composite in a substantially water-free environment. Essential to the achievement of this condition in the reforming zone is the control of the water level present in the charge stock and the hydrogen stream which are being charged to the zone. Best results are ordinarily obtained when the total amount of water entering the conversion zone from any source is held to a level less than 50 p.p.m. and preferably less than 20 p.p.m., expressed as weight of equivalent water in the charge stock. In general, this can be accomplished by careful control of the water present in the charge stock and in the hydrogen stream; the charge stock can be dried by using any suitable drying means known to the art such as a conventional solid adsorbent having a high selectivity for water; for instance, sodium or calcium crystalline aluminosilicates, silica gel, activated alumina, molecular sieves, anhydrous calcium sulfate, high surface area sodium and the like adsorbents. Similarly, the water content of the charge stock may be adjusted by suitable stripping operations in a fractionation column or like device. And in some cases, a combination of adsorbent drying and distillation drying may be used advantageously to effect almost complete removal of water from the charge stock. Preferably, the charge stock is dried to a level corresponding to less than 20 p.p.m. of $H_2O$ equivalent. In general, it is preferred to dry the hydrogen stream entering the hydrocarbon conversion zone down to a level of about 10 vol. p.p.m. of water or less. This can be conveniently accomplished by contacting the hydrogen stream with a suitable desiccant such as those mentioned above.

In the reforming embodiment, an effluent stream is withdrawn from the reforming zone and passed through a cooling means to a separation zone, typically maintained at about 25 to 150° F., wherein a hydrogen-rich gas is separated from a high octane product, commonly called an unstabilized reformate. Preferably, at least a portion of this hydrogen-rich gas is withdrawn from the separating zone and passed through an adsorption zone containing an adsorbent selective for water. The resultant substantially water-free hydrogen stream is then recycled through suitable compressing means back to the reforming zone. The liquid phase from the separating zone is then typically withdrawn and commonly treated in a fractionating system in order to adjust the butane concentration, thereby controlling front-end volatility of the resulting reformate.

The conditions utilized in the numerous hydrocarbon conversion embodiments of the present invention are those customarily used in the art for the particular reaction or combination of reactions that is to be effected. For instance, alkylaromatic and paraffin isomerization conditions include: a temperature of about 32° F. to about 1000° F. and preferably about 75° to about 600° F.; a pressure of atmospheric to about 100 atmospheres; a hydrogen to hydrocarbon mole ratio of about 0.5:1 to about 20:1, and an LHSV (calculated on the basis of equivalent liquid volume of the charge stock contacted with the catalyst per hour divided by the volume of conversion zone containing catalyst) of about 0.2 hr.$^{-1}$ to 10 hr.$^{-1}$. Dehydrogenation conditions include: a temperature of about 700° to about 1250° F., a pressure of about 0.1 to about 10 atmospheres, a liquid hourly space velocity of about 1 to 40 hr.$^{-1}$ and a hydrogen to hydrocarbon mole ratio of about 1:1 to 20:1. Likewise, typically hydrocracking conditions include: a pressure of about 500 p.s.i.g. to about 3000 p.s.i.g.; a temperature of about 400° F. to about 900° F.; an LHSV of about 0.1 hr.$^{-1}$ to about 10 hr.$^{-1}$, and hydrogen circulation rates of about 1000 to 10,000 s.c.f. per barrel of charge.

In the reforming embodiment of the present invention the pressure utilized is selected from the range of about 0 p.s.i.g. to about 1000 p.s.i.g., with the preferred pressure being about 50 p.s.i.g. to about 350 p.s.i.g. Particularly good results are obtained at low pressure; namely, a pressure of about 75 to 200 p.s.ig. In fact, it is a singular advantage of the present invention that it allows stable operation at lower pressure than have heretofore been successfully utilized in so-called "continuous" reforming systems (i.e., reforming for periods of about 15 to about 200 or more barrels of charge per pound of catalyst without regeneration). In other words, the catalyst of the present invention allows the operation of a continuous reforming system to be conducted at lower pressure (i.e., 50 to about 350 p.s.i.g.) for about the same or better catalyst life before regeneration as has been heretofore realized with conventional catalysts at higher pressures (i.e., 400 to 600 p.s.i.g.). On the other hand, the stability feature of the present invention enables reforming operations conducted at pressures of 400 to 600 p.s.i.g. to achieve substantially increased catalyst life before regeneration.

Similarly, the temperature required for reforming is generally lower than that required for a similar reforming operation using a high quality platinum catalyst of the prior art. This significant and desirable feature of the present invention is a consequence of the selectivity of the catalyst of the present invention for the octaine-upgrading reactions that are preferably induced in a typical reforming operation. Hence, the present invention requires a temperature in the range of from about 800° F. to about 1100° F. and preferably about 900° F. to about 1050° F. As is well known to those skilled in the continuous reforming art, the initial selection of the temperature within this broad range is made primarily as a function of the desired octane of the product reformate considering the characteristics of the charge stock and of the catalyst. Ordinarily, the temperature then is thereafter slowly increased during the run to compensate for the inevitable deactivation that occurs to provide a constant octane product. Therefore, it is a feature of the present invention that the rate at which the temperature is increased in order to maintain a constant octane product is substantially lower for the catalyst of the present invention than for the high quality reforming catalyst which is manufactured in exactly the same manner as the catalyst of the present invention except for the inclusion of the iron and the Group IV–A metallic components. Moreover, for the catalyst of the present invention, the $C_5+$ yield loss for a given temperature increase is substantially lower than for a high quality reforming catalyst of the prior art. In addition, hydrogen production is substantially higher.

The reforming embodiment of the present invention also typically utilizes sufficient hydrogen to provide an amount of about 1 to about 20 moles of hydrogen per mole of hydrocarbon entering the reforming zone with excellent results being obtained when about 5 to about 10 moles of hydrogen are used per mole of hydrocarbon. Likewise, the liquid hourly space velocity (LHSV) used in reforming is selected from the range of about 0.1 to about 10 hr.$^{-1}$ with a value in the range of about 1.0 to about 5 hr.$^{-1}$ being preferred. In fact, it is a feature of the present invention that it allows operations to be conducted at higher LHSV than normally can be stably achieved in a continuous reforming process with a high quality reforming catalyst of the prior art. This last feature is of immense economic significance because it allows a continuous reforming process to operate at the same throughput level with less catalyst inventory than that heretofore used with conventional reforming catalysts at no sacrifice in catalyst life before regeneration.

The following working examples are given to illustrate further the preparation of the catalytic composite of the present invention and the use thereof in the conversion of hydrocarbons. It is understood that the examples are intended to be illustrative rather than restrictive.

EXAMPLE I

This example demonstrates a particularly good method of preparing the preferred catalytic composite of the present invention.

An alumina carrier material comprising 1/16 inch spheres is prepared by: forming an aluminum hydroxyl chloride sol by dissolving substantially pure aluminum pellets in a hydrochloric acid solution, adding hexamethylene-tetramine to the resulting sol, gelling the resulting solution by dropping it into an oil bath to form spherical particles of an aluminum hydrogel, aging and washing the resulting particles and finally drying and calcining the aged and washed particles to form spherical particles of gamma-alumina containing about 0.3 wt. percent combined chloride. Additional details as to this method of preparing the preferred carrier material are given in the teachings of U.S. Pat. No. 2,620,314.

A measured amount of germanium tetrachloride is dissolved in anhydrous ethanol. The resulting solution is then aged at room temperature until an equilibrium condition is established therein. An aqueous solution containing chloroplatinic acid, iron dichloride and hydrogen chloride is then prepared. The two solutions are then intimately admixed and used to impregnate the gamma-alumina particles in amounts, respectively, calculated to result in a final composite containing 0.375 wt. percent Pt, 0.5 wt. percent Ge, and 0.1 wt. percent Fe. In order to insure uniform distribution of the metallic components throughout the carrier material, this impregnation step is performed by adding the carrier material particles to the impregnation mixture with constant agitation. In addition, the volume of the solution is two times the volume of the carrier material particles. The impregnation mixture is maintained in contact with the carrier material particles for a period of about ½ hour at a temperature of about 70° F. Thereafter, the temperature of the impregnation mixture is raised to about 225° F. and the excess solution is evaporated in a period of about 1 hour. The resulting dried particles are then subjected to a calcination treatment in an air atmosphere at a temperature of about 925° F. for about 1 hour. The calcined spheres are then contacted with an air stream containing $H_2O$ and HCl in a mole ratio of about 40:1 for about 4 hours at 975° F. in order to adjust the halogen content of the catalyst particles to a value of about 0.90.

The resulting catalyst particles are analyzed and found to contain, on an elemental basis, about 0.375 wt. percent platinum, about 0.5 wt. percent germanium, about 0.1 wt. percent iron, and about 0.85 wt. percent chloride. For this catalyst, the atomic ratio of germanium to platinum is 3.56:1 and the atomic ratio of iron to platinum is 0.94:1.

Thereafter, the catalyst particles are subjected to a dry-pre-reduction treatment by contacting them for 1 hour with a substantially pure hydrogen stream containing less than 20 vol. p.p.m. $H_2O$ at a temperature of about 1000° F., a pressure slightly above atmospheric and a flow rate of the hydrogen stream through the catalyst particles corresponding to a gas hourly space velocity of about 720 hr.$^{-1}$.

EXAMPLE II

A portion of the spherical particles produced by the method described in Example I are loaded into a scale model of a continuous, fixed bed reforming plant of conventional design. In this plant a heavy Kuwait naphtha and hydrogen are continuously contacted at reforming conditions: a liquid hourly space velocity of 1.5 hr.$^{-1}$, a pressure of 100 p.s.i.g., a hydrogen to hydrocarbon mole ratio of 8.1, and a temperature sufficient to continuously produce a $C_5+$ reformate of 102 F–1 clear. It is to be noted that these are exceptionally severe conditions.

The heavy Kuwait naphtha has an API gravity of 60° F. of 60.4, an initial boiling point of 184° F., a 50% boiling point of 256° F., and an end boiling point of 360° F. In addition, it contains about 8 vol. percent aromatics, 71 vol. percent paraffins, 21 vol. percent naphthenes, 0.5 wt. parts per million sulfur, and 5 to 8 wt. parts per million water. The F–1 clear octane number of the raw stock is 40.0.

The fixed bed reforming plant is made up of a reactor containing the catalyst, a hydrogen separation zone, a debutanizer column, and suitable heating, pumping, cooling, and controlling means. In this plant, a hydrogen recycle stream and the charge stock are commingled and heated to the desired temperature. The resultant mixture is then passed downflow into a reactor containing the catalyst as a fixed bed. An effluent stream is then withdrawn from the bottom of the reactor, cooled to about 55° F. and passed to a separating zone wherein a hydrogen-rich gaseous phase separates from a liquid hydrocarbon phase. A portion of the gaseous phase is continuously passed through a high surface area sodium scrubber and the resulting sulfur-free hydrogen stream recycled to the reactor in order to supply hydrogen thereto, and the excess hydrogen over that needed for plant pressure is recovered as excess separator gas. The liquid hydrocarbon phase from the hydrogen separating zone is withdrawn therefrom and passed to a debutanizer column of conventional design wherein light ends are taken overhead as debutanizer gas and a $C_5+$ reformate stream recovered as bottoms.

The test run is continued for a catalyst life of about 20 barrels of charge per pound of catalyst utilized, and it is determined that the activity, selectivity, and stability of the present catalyst are vastly superior to those observed in a similar type test with a conventional commercial reforming catalyst which utilizes platinum as the sole metallic component. More specifically, the results obtained from the subject catalyst are superior to the platinum metal-containing catalyst of the prior art in the areas of hydrogen production, $C_5+$ yield at octane, average rate of temperature increase necessary to maintain octane, and $C_5+$ yield decline rate.

It is intended to cover by the following claims all changes and modifications of the above disclosure of the present invention which would be self-evident to a man of ordinary skill in the catalyst formulation art or the hydrocarbon conversion art.

I claim as my invention:

1. A hydrocarbon reforming which comprises contacting the hydrocarbon, at reforming conditions, with a catalytic composite comprising a combination of catalytically effective amounts of a platinum group component, an iron component and a germanium component with a porous carrier material, the composite containing, on an elemental basis, about 0.01 to about 2 wt. percent of the platinum group metal, about 0.01 to 1 wt. percent of iron and about 0.01 to about 5 wt. percent of germanium.

2. A process as defined in claim 1 wherein the platinum group component of the composite is platinum or a compound of platinum.

3. A process as defined as in claim 1 wherein the platinum group component of the composite is palladium or a compound of palladium.

4. A process as defined in claim 1 wherein the porous carrier material is a refractory inorganic oxide.

5. A process as defined in claim 4 wherein the refractory inorganic oxide is alumina.

6. A process as defined in claim 1 wherein the catalytic composite contains a halogen component.

7. A process as defined in claim 6 wherein the halogen component of the composite is chlorine or a compound of chlorine.

8. A process as defined in claim 1 wherein the atomic ratio of iron to platinum group metal contained in the composite is about 0.1:1 to about 1.5:1 and wherein the atomic ratio of the germanium to the platinum group metal contained in the composite is about 0.05:1 to about 10:1.

9. A process as defined in claim 1 wherein the type of hydrocarbon conversion is catalytic reforming of a gasoline fraction, wherein the hydrocarbon is contained in a gasoline fraction, and wherein the contacting is effected in the presence of hydrogen.

10. A process as defined in claim 1 wherein the reforming conditions include a temperature of about 800 to about 1100° F., a pressure of about 0 to about 1000 p.s.i.g., a liquid hourly space velocity of about 0.1 to about 10 hr.$^{-1}$, and a mole ratio of hydrogen to hydrocarbon of about 1:1 to about 20:1.

11. A process as defined in claim 10 wherein the pressure is about 50 to about 350 p.s.i.g.

12. A process as defined in claim 9 wherein the contacting is performed in a substantially water-free environment.

References Cited

UNITED STATES PATENTS

| | | | |
|---|---|---|---|
| 2,906,700 | 9/1959 | Stine et al. | 208—138 |
| 3,580,970 | 5/1971 | Swift | 260—621 H |
| 3,630,961 | 12/1971 | Wilhelm | 252—439 |
| 3,691,102 | 9/1972 | Swift | 252—469 |

DELBERT E. GANTZ, Primary Examiner

S. L. BERGER, Assistant Examiner

U.S. Cl. X.R.

208—138; 252—441, 466 B